United States Patent
Magari et al.

(10) Patent No.: US 8,563,170 B2
(45) Date of Patent: Oct. 22, 2013

(54) NEGATIVE ELECTRODE FOR ALKALINE STORAGE BATTERY, FABRICATION METHOD THEREOF, AND ALKALINE STORAGE BATTERY

(75) Inventors: Yoshifumi Magari, Tokushima (JP); Tadayoshi Tanaka, Takatsuki (JP); Shigekazu Yasuoka, Takasaki (JP); Masaru Kihara, Takasaki (JP); Akira Saguchi, Takasaki (JP); Toshiki Sato, Takasaki (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 522 days.

(21) Appl. No.: 12/702,806

(22) Filed: Feb. 9, 2010

(65) Prior Publication Data

US 2010/0203385 A1   Aug. 12, 2010

(30) Foreign Application Priority Data

Feb. 12, 2009 (JP) .................................. 2009-030283
Oct. 1, 2009 (JP) .................................. 2009-229197
Dec. 1, 2009 (JP) .................................. 2009-273060

(51) Int. Cl.
*H01M 4/60* (2006.01)

(52) U.S. Cl.
USPC ......................................... 429/212; 429/214

(58) Field of Classification Search
USPC .................................................. 429/212, 214
See application file for complete search history.

(56) References Cited

U.S. PATENT DOCUMENTS

| | | | |
|---|---|---|---|
| 4,608,325 A | 8/1986 | Ismail | |
| 4,861,688 A * | 8/1989 | Miura et al. | ................ 429/206 |
| 2004/0214083 A1 | 10/2004 | Nakayama et al. | |

FOREIGN PATENT DOCUMENTS

| | | |
|---|---|---|
| JP | 04-192258 A | 7/1992 |
| JP | 4-284354 A | 10/1992 |
| JP | 5-258748 A | 10/1993 |
| JP | 7-235304 A | 9/1995 |
| JP | 08-88003 A | 4/1996 |
| JP | 8-102320 A | 4/1996 |
| JP | 2002-069554 A | 3/2002 |
| JP | 2005-190863 A | 7/2005 |

OTHER PUBLICATIONS

European Search Report dated May 26, 2010, issued in corresponding European Patent Application No. 10001430.7.

* cited by examiner

*Primary Examiner* — Stuart Hendrickson
(74) *Attorney, Agent, or Firm* — Westerman, Hattori, Daniels & Adrian, LLP

(57) ABSTRACT

A negative electrode for alkaline storage battery using a hydrogen-absorbing alloy includes fluorinated oil and a surface active agent.

6 Claims, 1 Drawing Sheet

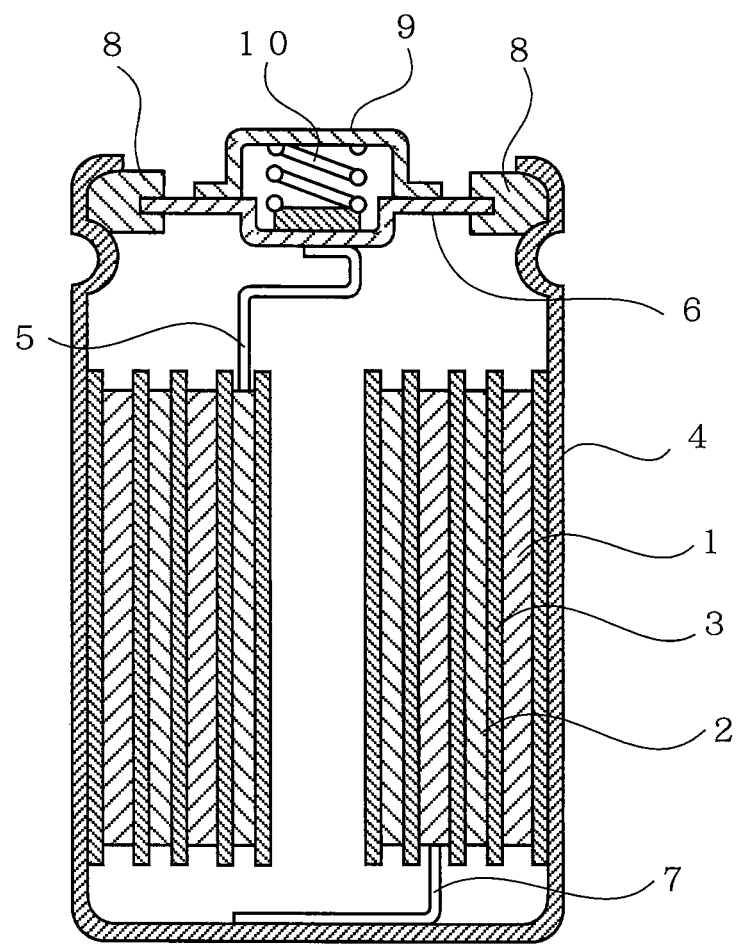

NEGATIVE ELECTRODE FOR ALKALINE STORAGE BATTERY, FABRICATION METHOD THEREOF, AND ALKALINE STORAGE BATTERY

RELATED APPLICATIONS

The priority application Number Japanese Patent Applications 2009-30283, 2009-229197 and 2009-273060 upon which this application is based is hereby incorporated by reference.

BACKGROUND OF THE INVENTION

1. Field of the Invention

The present invention relates to an alkaline storage battery comprising a positive electrode, a negative electrode utilizing a hydrogen-absorbing alloy, and an alkaline electrolyte and the negative electrodes used in such an alkaline storage battery. More particularly, a feature of the invention is to improve the above-described negative electrode for alkaline storage battery for the purpose of restricting oxidation of the hydrogen-absorbing alloy by the alkaline electrolyte in the case of repeated charging and discharging, so that an alkaline storage battery with excellent cycle life can be obtained.

2. Description of the Related Art

Conventionally, nickel-cadmium storage batteries have been commonly used as alkaline storage batteries. In recent years, nickel-metal hydride storage batteries using hydrogen-absorbing alloys as their negative electrodes have drawn considerable attention from the viewpoints that they have higher capacity than nickel-cadmium storage batteries and are more environmentally safe because of being free of cadmium.

As the alkaline storage batteries of nickel-metal hydride storage batteries have been used in various portable devices and hybrid electric cars, demands for further higher performance in the nickel-metal hydride storage batteries have been increasing.

In such alkaline storage batteries, hydrogen-absorbing alloys such as a $LaNi_5$ type hydrogen-absorbing alloy of rare earth-nickel intermetallic compound having a $CaCu_5$ crystal structure as its main phase and a hydrogen-absorbing alloy containing Ti, Zr, V and Ni as its component elements and having Laves phase as its main phase, have been generally used for their negative electrodes.

However, these hydrogen-absorbing alloys generally do not necessarily have sufficient hydrogen-absorbing capability, and it has been difficult to increase the capacity of the alkaline storage batteries further.

In recent years, in order to improve the hydrogen-absorbing capability of the rare earth-nickel hydrogen-absorbing alloy, it has been proposed to use a rare earth-Mg—Ni-based hydrogen-absorbing alloy having a $Ce_2Ni_7$ type, a $CeNi_3$ type, or the similar type crystal structure, rather than a $CaCu_5$ type, by adding Mg or the like to the rare earth-nickel hydrogen-absorbing alloy. (See, for example, Japanese Published Unexamined Patent Application No. 2002-69554.)

Such a rare earth-Mg—Ni-based hydrogen-absorbing alloy is easily cracked in general and a new phase having a high reactivity is easily formed which contributes to discharge reaction, and therefore, high rate discharge performances as well as discharge performances under low temperature environments are relatively favorable.

However, corrosion resistance in the above-described rare earth-Mg—Ni-based hydrogen-absorbing alloy is degraded, and the above-described hydrogen absorbing alloy itself is deteriorated because of oxidation by an alkaline electrolyte during repeated charging and discharging. Also, the alkaline electrolyte in an alkaline storage battery is gradually consumed, and therefore, the amount of alkaline electrolyte contained in a separator is decreased. As a result, inner resistance in the alkaline storage battery is increased and cycle life thereof is greatly decreased.

In this connection, there has been proposed a storage battery, such as disclosed in JP-A 7-235304, which contains a nonionic surface active agent as an inhibitor of element-elution from a hydrogen-absorbing alloy, that is to say, an inhibitor of oxidization of the hydrogen-absorbing alloy, so that the storage battery's cycle life is improved.

However, even if such a nonionic surface active agent is contained in the storage battery, elution of the elements, namely, oxidization of the hydrogen-absorbing alloy is not fully inhibited, and improvement of the alkaline storage battery's cycle life is not fully attained.

Also, there has been proposed a storage battery, such as disclosed in JP-A 2005-190863 and JP-A 4-284354, which comprises a negative electrode wherein a fluorine resin is added to improve the storage battery's cycle life.

However, if the fluorine resin is added to the negative electrode, while the cycle life is improved, discharge performances are degraded.

SUMMARY OF THE INVENTION

An object of the invention is to improve a negative electrode for alkaline storage battery which is used in an alkaline storage battery utilizing a hydrogen-absorbing alloy, particularly a rare earth-Mg—Ni-based hydrogen-absorbing alloy. Also, it is an object of the invention to fully inhibit oxidation of hydrogen-absorbing alloy powder in the case of repeated charging and discharging so that an alkaline storage battery having excellent cycle life can be obtained, and at the same time, to inhibit the degradation of discharge performances of the battery.

In the present invention, fluorinated oil and a surface active agent are contained in the negative electrode for alkaline storage battery utilizing the hydrogen-absorbing alloy.

The above-mentioned fluorinated oil is oil including fluorine atom in its molecule and is a liquid state at 70° C. or less, more preferably be the liquid state at 25° C. (room temperature). For example, at least one kind selected from a low polymer of chlorotrifluoroethylene and perfluoropolyether may be used as the fluorinated oil. As market products, DAIFLOIL and DEMNUM made by DAIKIN IND LTD, and krytox made by DUPONT may be used.

According to the present invention, the negative electrode for alkaline storage battery contains the fluorinated oil and the surface active agent, and therefore, the fluorinated oil having stability in the alkaline electrolyte is well uniformly dispersed and covers the surface of the hydrogen-absorbing alloy. As a result, a contact between the hydrogen absorbing alloy and the alkaline electrolyte is restricted and the oxidization of hydrogen-absorbing alloy in the case of repeated charging and discharging is inhibited, so that the alkaline storage battery's cycle life is improved.

Further, covering of the surface of the hydrogen-absorbing alloy with fluorinated oil being appropriately dispersed results in uniform electrode reaction. As a result of uniform electrode reaction, degradation of discharge performances, particularly, the degradation of high-rate discharge performances is inhibited.

It is preferable that 0.01 to 1 parts by mass of the fluorinated oil is added per 100 parts by mass of the hydrogen-absorbing alloy. This range is determined based on the following reasons: If the amount of fluorinated oil to be added is less than 0.01 parts by mass, sufficient effects can not be obtained because of shortage of fluorinated oil. On the other hand, if the amount of fluorinated oil to be added is more than 1 parts by mass, discharge efficiency in the negative electrode for alkaline storage battery is deteriorated, and the high-rate discharge performances are degraded.

As the above-described surface active agent, although the kind is not particularly limited, one or several kinds of higher alcohol-based compound may be used.

It is preferable that 0.001 to 0.1 parts by mass of the surface active agent is added per 100 parts by mass of the hydrogen-absorbing alloy. This range is determined based on the following reasons: If the amount of surface active agent to be added is less than 0.001 parts by mass, sufficient effects can not be obtained because of shortage of surface active agent. On the other hand, if the amount of surface active agent to be added is more than 0.1 parts by mass, foaming in preparation of slurry becomes too large, and therefore, a fabrication of battery becomes difficult.

In the negative electrode for alkaline storage battery of the present invention, although the kind of usable hydrogen-absorbing alloy is not particularly limited, the use of rare earth-Mg—Ni-based hydrogen-absorbing alloy having a $Ce_2Ni_7$ type, a $CeNi_3$ type, or the similar type crystal structure featuring excellent hydrogen absorbing capability with low corrosion resistance may particularly be effective.

In the negative electrode for alkaline storage battery of the present invention, it is preferable to use the hydrogen-absorbing alloy featuring excellent hydrogen absorbing capability with low corrosion resistance represented by the general formula $Ln_{1-x}Mg_xNi_{y-a-b}Al_aM_b$ wherein Ln is at least one element selected from the group consisting of Zr, Ti and rare-earth elements including Y, M is at least one element selected from the group consisting of V, Nb, Ta, Cr, Mo, Mn, Fe, Co, Ga, Zn, Sn, In, Cu, Si, P and B, $0.05 \leq x \leq 0.30$, $0.05 \leq a \leq 0.30$, $0 \leq b \leq 0.50$ and $2.8 \leq y \leq 3.9$.

According to the present invention, since the above-described hydrogen-absorbing alloy represented by the general formula is used, a high-capacity alkaline storage battery can be obtained and degradation of the hydrogen-absorbing alloy because of oxidization by the alkaline electrolyte is appropriately inhibited, so that the cycle life is remarkably improved.

Examples of methods of containing fluorinated oil and surface active agent in the negative electrode include a method of directly mixing the fluorinated oil, the surface active agent and the hydrogen-absorbing alloy powder, a method of mixing the hydrogen-absorbing alloy powder, the fluorinated oil, and the surface active agent with at least one kind selected from an aqueous dispersion of non-aqueous binder, an aqueous dispersion of conductive material, an aqueous solution of aqueous binder, an aqueous solution of viscosity improver and water, and a method of impregnating the negative electrode into a solution containing the fluorinated oil and the surface active agent. Some of the aqueous dispersion of non-aqueous binder and the aqueous dispersion of conductive material contain the surface active agent for the purpose of enhancing dispersion of binder components and conductive material. In the case of using such aqueous dispersion, its surface active agent may be utilized, and it may be possible to newly add the surface active agent to the negative electrode.

The alkaline storage battery according to the present invention comprises the positive electrode, the negative electrode utilizing the hydrogen-absorbing alloy, and the alkaline electrolyte, and as the negative electrode, the above-described negative electrode for alkaline storage battery is used.

The fabrication method of the negative electrode for alkaline storage battery according to the present invention is characterized in that the hydrogen-absorbing alloy powder is mixed to the prepared dispersion wherein the fluorinated oil and the surface active agent are dispersed in at least one kind selected from the aqueous dispersion of non-aqueous binder, the aqueous dispersion of conductive material, the aqueous solution of aqueous binder, the aqueous solution of viscosity improver and water to prepare negative electrode slurry. In the case of using the aqueous dispersion of non-aqueous binder and the aqueous dispersion of conductive material containing surface active agent, the surface active agent may be utilized, and it may be possible to newly add the surface active agent to the negative electrode.

In the case of using the above-described fabrication method of the negative electrode for alkaline storage battery, as compared with the method of directly mixing the fluorinated oil, the surface active agent and the hydrogen-absorbing alloy powder, the method of mixing the hydrogen-absorbing alloy powder, the fluorinated oil, and the surface active agent with at least one kind selected from the aqueous dispersion of non-aqueous binder, the aqueous dispersion of conductive material, the aqueous solution of aqueous binder, the aqueous solution of viscosity improver and water, and the method of impregnating the negative electrode into the solution containing the fluorinated oil and the surface active agent, it is possible to disperse the fluorinated oil and the surface active agent in advance before mixing with the hydrogen-absorbing alloy.

Therefore, in the case of using the above-described fabrication method of the negative electrode for alkaline storage battery, the hydrogen-absorbing alloy powder is mixed in a condition where the fluorinated oil is appropriate uniformly dispersed, and the negative electrode wherein the fluorinated oil is more uniformly dispersed on the surface of the hydrogen-absorbing alloy particle can be obtained. Thus, since the fluorinated oil is appropriate uniformly dispersed on the surface of the hydrogen-absorbing alloy particle, the contact between the hydrogen-absorbing alloy and the alkaline electrolyte is restricted and the oxidization of hydrogen-absorbing alloy is inhibited, so that the cycle life is improved.

In the above-described fabrication method of the negative electrode for alkaline storage battery, it is preferable to use a homogenizer for dispersion of the fluorinated oil and the surface active agent.

The fluorinated oil is more uniformly dispersed by using the homogenizer. Further, since the hydrogen-absorbing alloy powder is mixed in the condition where the fluorinated oil is more uniformly dispersed, the negative electrode wherein the fluorinated oil is appropriately more uniformly dispersed on the surface of the hydrogen-absorbing alloy particle can be obtained. Thus, since the fluorinated oil is appropriately more uniformly dispersed on the surface of the hydrogen-absorbing alloy particle, the contact between the hydrogen-absorbing alloy and the alkaline electrolyte is restricted and the oxidization of the hydrogen-absorbing alloy is inhibited, so that the cycle life is improved.

As the homogenizer, a high-speed rotary homogenizer, a high-pressure and high-speed homogenizer, or a cavitation ultrasonic homogenizer may be used.

In the above-described fabrication method of the negative electrode for alkaline storage battery, it is preferable to disperse the fluorinated oil and the surface active agent particularly in the aqueous dispersion of non-aqueous binder.

In such a case, in addition to dispersibility of fluorinated oil, the dispersibility of the aqueous dispersion of non-aqueous binder is also enhanced. As a result, the negative electrode wherein the binder is more uniformly dispersed can be obtained.

As the above-described non-aqueous binder, although the kind is not particularly limited, styrene-butadiene copolymer or acrylic resin may be used. As the above-described conductive material, although the kind is not particularly limited, nickel metal powder or carbon powder may be used. Further, as the above-described aqueous binder, although the kind is not particularly limited, carboxymethyl cellulose, polyvinyl pyrrolidone, or polyethylene oxide may be used. Still further, as the above-described viscosity improver, although the kind is not particularly limited, polyacrylic acid sodium may be used.

In the present invention, the fluorinated oil and the surface active agent are contained in the negative electrode for alkaline storage battery utilizing the hydrogen-absorbing alloy, and therefore, the fluorinated oil having stability in the alkaline electrolyte is uniformly dispersed and covers the surface of the hydrogen-absorbing alloy, and the contact between the hydrogen-absorbing alloy and the alkaline electrolyte is restricted. As a result, even in the case of repeated charging and discharging, the oxidization of hydrogen-absorbing alloy is inhibited, so that the alkaline storage battery's cycle life is improved, and the electrode reaction uniformly occurs, so that deterioration of discharge performances, particularly, deterioration of the high-rate discharge performances is inhibited.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 1 is a schematic sectional view illustrating an alkaline storage battery fabricated in Examples 1 to 3 and Comparative Examples 1 to 5 of the present invention.

DESCRIPTION OF THE PREFERRED EMBODIMENTS

An alkaline storage battery according to the invention will hereinbelow be described in detail by way of examples thereof. In addition, it will be demonstrated by the comparison with comparative examples that cycle performances are particularly improved in the alkaline storage battery of examples of the invention. It is to be noted that the negative electrode for alkaline storage battery and the alkaline storage battery according to the invention are not limited to the following examples and may be practiced with suitable modifications made thereto so long as such modifications do not deviate from the scope of the invention.

EXAMPLE 1

In Example 1, a positive electrode, a negative electrode and an alkaline electrolyte prepared in the following manner were used.
Fabrication of Negative Electrode
A negative electrode was prepared in the following matter. La, Nd, Sm, Mg, Ni and Al were mixed together to produce a predetermined alloy composition, and the mixture was melted in a high frequency induction melting furnace in argon gas atmosphere and then cooled to prepare hydrogen-absorbing alloy ingots.

Next, the hydrogen-absorbing alloy ingots thus prepared were homogenized by a heat treatment for 10 hours in inert atmosphere at a temperature that is 60° C. lower than a liquefaction beginning temperature. Then, the hydrogen-absorbing alloy ingots were mechanically pulverized in the inert atmosphere and classified to obtain a hydrogen-absorbing alloy powder which had an average particle size of 65 μm which is 50% of mass integral. After that, the composition of the resultant hydrogen-absorbing alloy was analyzed by a high-frequency plasma emission spectroanalysis device (ICP). As a result of analysis, the composition was $La_{0.2}Nd_{0.35}Sm_{0.35}Mg_{0.10}Ni_{3.30}Al_{0.20}$.

Further, low polymer of chlorotrifluoroethylene of fluorinated oil (DAIFLOIL #20, an average molecule weight of about 1000, made by DAIKIN IND LTD.) and a higher alcohol nonionic surface active agent (LEOCOL made by Lion Corporation) were previously dispersed in water by using a high-speed rotary homogenizer.

Next, the aqueous dispersion of low polymer of chlorotrifluoroethylene and higher alcohol nonionic surface active agent, the hydrogen-absorbing alloy powder, an aqueous dispersion of styrene-butadiene copolymer rubber (SBR) of non-aqueous binder, polyacrylic acid sodium of viscosity improver, carboxymethyl cellulose of aqueous binder, nickel metal flake of conductive material and carbon black of the conductive material were kneaded to prepare negative electrode material paste. Specifically, per 100 parts by mass of the hydrogen-absorbing alloy powder, 0.1 parts by mass of low polymer of chlorotrifluoroethylene, 0.015 parts by mass of higher alcohol nonionic surface active agent, 50 parts by mass of water, 1 parts by mass of aqueous dispersion of SBR containing 50 mass of SBR, 0.2 parts by mass of polyacrylic acid sodium, 0.2 parts by mass of carboxymethyl cellulose, 1 parts by mass of nickel metal flake and 1 parts by mass of carbon black were used to prepare the negative electrode material paste. As the high-speed rotary homogenizer, T25 digital ULTRA-TURRA made by IKA was used, and as a shaft generator, S25N-25F was used.

The prepared paste was uniformly applied onto both sides of a conductive substrate made of punched metal, dried and then pressed. The resultant material was cut into predetermined dimensions to prepare the negative electrode.
Fabrication of Positive Electrode
A positive electrode was prepared as follows. Nickel hydroxide powder containing 2.5 mass % of zinc and 1.0 mass % of cobalt was put into an aqueous solution of cobalt sulfate, and 1 mol of aqueous solution of sodium hydroxide was gradually dropped into the mixture with stirring to cause them to react with each other until the pH became 11; thereafter, the resulting precipitate was collected by filtration, rinsed with water, and vacuum dried. Thus, nickel hydroxide on which surface 5 mass % of cobalt hydroxide was coated was obtained. A valence of cobalt contained in the cobalt oxide was 3.05.

Then, 25 mass % aqueous solution of sodium hydroxide was added and impregnated into the nickel hydroxide the surface of which was coated with cobalt hydroxide, at a mass ratio of 1:10, and the resultant material was heat-treated at 85° C. for 8 hours with stirring. Thereafter, the resultant material was rinsed with water and dried at 65° C., whereby a positive electrode active material in which the surface of the nickel hydroxide was coated with sodium-containing cobalt oxide was obtained.

Then, 95 parts by mass of the positive electrode material thus prepared, 3 parts by mass of zinc oxide, and 2 parts by mass of cobalt hydroxide were mixed together, and 50 parts by mass of an aqueous solution of 0.2 mass % hydroxypropylcellulose was added to the mixture to prepare slurry.

The slurry thus prepared was then filled into nickel foam having a weight per unit area of about 600 g/m$^2$. The resultant was dried and pressed, and thereafter cut into predetermined dimensions. Thus, the positive electrode composed of non-sintered nickel positive electrode was prepared.

In addition to the use of the positive electrode and the negative electrode fabricated as above, a nonwoven fabric made of polypropylene was used as a separator. As an alkaline electrolyte, an alkaline electrolyte containing KOH, NaOH, and LiOH at a mass ratio of 8:0.5:1 of which total amount was 30 mass %, was used. Using these components, an alkaline storage battery of AA size having a design capacity of 1500 mAh and a cylindrical shape as illustrated in FIG. 1 was fabricated.

The alkaline storage battery was assembled in the following manner. As illustrated in FIG. 1, a negative electrode 1 and a positive electrode 2 were spirally coiled with a separator 3 interposed therebetween and these were accommodated in a battery can 4. The positive electrode 2 was connected to a positive electrode cap 6 via a positive electrode lead 5, and the negative electrode 1 was connected to the battery can 4 via a negative electrode lead 7. Then, the alkaline electrolyte was poured into the battery can 4. Thereafter, an insulative packing 8 was placed between the battery can 4 and the positive electrode cap 6, and the battery can 4 was sealed. The battery can 4 and the positive electrode cap 6 were electrically insulated by the insulative packing 8. A coil spring 10 was placed between the positive electrode cap 6 and a positive electrode external terminal 9. The coil spring 10 can be compressed to release gas from the interior of the battery to atmosphere when the internal pressure of the battery unusually increases.

EXAMPLE 2

In Example 2, in preparation of the negative electrode of Example 1, the low polymer of chlorotrifluoroethylene and the higher alcohol nonionic surface active agent were previously dispersed in the aqueous dispersion of SBR by using the high-speed rotary homogenizer.

Next, the aqueous dispersion of low polymer of chlorotrifluoroethylene, higher alcohol nonionic surface active agent and SBR, the hydrogen-absorbing alloy powder, water, polyacrylic acid sodium, carboxymethyl cellulose, nickel metal flake and carbon black were kneaded to prepare negative electrode material paste. Except for the above, an alkaline storage battery of Example 2 was fabricated in the same manner as in Example 1.

EXAMPLE 3

In Example 3, in preparation of the negative electrode of Example 1, the low polymer of chlorotrifluoroethylene and the higher alcohol nonionic surface active agent were previously dispersed in water by using a planetary mixer. Except for the above, an alkaline storage battery of Example 3 was fabricated in the same manner as in Example 1. As the planetary mixer, KENMIXCHEF KM-300 made by AIKOSHA SEISAKUSHO:KK was used.

COMPARATIVE EXAMPLE 1

In Comparative Example 1, in preparation of the negative electrode of Example 1, the low polymer of chlorotrifluoroethylene and the higher alcohol nonionic surface active agent were not added. Except for the above, an alkaline storage battery of Comparative Example 1 was fabricated in the same manner as in Example 1.

COMPARATIVE EXAMPLE 2

In Comparative Example 2, in preparation of the negative electrode of Example 1, the low polymer of chlorotrifluoroethylene was not added. Except for the above, an alkaline storage battery of Comparative Example 2 was fabricated in the same manner as in Example 1.

COMPARATIVE EXAMPLE 3

In Comparative Example 3, in preparation of the negative electrode of Example 3, instead of the low polymer of chlorotrifluoroethylene, an aqueous dispersion of polytetrafluoroethylene of fluorine resin having a molecular weight of 2,000,000 to 10,000,000 and being solid at a temperature less than 70° C. was used. The aqueous dispersion of polytetrafluoroethylene was added so that the amount of polytetrafluoroethylene to be added was 0.1 parts by mass per 100 parts by mass of the hydrogen-absorbing alloy powder. Except for the above, an alkaline storage battery of Comparative Example 3 was fabricated in the same manner as in Example 3.

COMPARATIVE EXAMPLE 4

In Comparative Example 4, in preparation of the negative electrode of Example 3, instead of the low polymer of chlorotrifluoroethylene, the aqueous dispersion of polytetrafluoroethylene of fluorine resin having the molecular weight of 2,000,000 to 10,000,000 and being solid at the temperature less than 70° C. was used. The aqueous dispersion of polytetrafluoroethylene was added so that the amount of polytetrafluoroethylene to be added was 0.5 parts by mass per 100 parts by mass of the hydrogen-absorbing alloy powder. Except for the above, an alkaline storage battery of Comparative Example 4 was fabricated in the same manner as in Example 3.

COMPARATIVE EXAMPLE 5

In Comparative Example 5, in preparation of the negative electrode of Example 3, instead of the low polymer of chlorotrifluoroethylene, the aqueous dispersion of polytetrafluoroethylene of fluorine resin having a molecular weight of more than hundreds of thousands and being solid at the temperature less than 70° C. was used. The aqueous dispersion of polytetrafluoroethylene was added so that the amount of polytetrafluoroethylene to be added was 0.5 parts by mass per 100 parts by mass of the hydrogen-absorbing alloy powder. Except for the above, an alkaline storage battery of Comparative Example 5 was fabricated in the same manner as in Example 3.

It is noted here that in the negative electrode fabricated in Comparative Examples 4 and 5, liquidity of the negative electrode material paste in fabrication was degraded, and the fabrication of the negative electrode became troublesome, so that productivity of the negative electrode was decreased. Further, in the negative electrode fabricated in Comparative Examples 4 and 5, the electrode was easy to be expanded when the electrode plate was pressed, the electrode plate was corrugated, and quality was low. The reason for that is supposed to be because of inclusion of the fluorine resin which is solid in the alloy slurry.

On the contrary, the negative electrode of Comparative Example 3 containing the fluorine resin in the negative electrode material paste did not have such a problem. The reason for that is supposed to be because the amount of fluorine resin to be added in Comparative Example 3 was smaller as compared with Comparative Examples 4 and 5.

Further, in the negative electrode of Examples 1 to 3 containing the fluorinated oil in the negative electrode material paste, the above-described problem did not occur.

Next, each of the alkaline storage batteries of Examples 1 to 3 and Comparative Examples 1 to 5 was charged at a current of 150 mA for 16 hours and then discharged at a current of 1500 mA until the battery voltage became 1.0 V. With this being one cycle, three cycles were performed to activate the alkaline storage batteries of Examples 1 to 3 and Comparative Examples 1 to 5.

Then, each of the alkaline storage batteries of Examples 1 to 3 and Comparative Examples 1 to 5 that were activated in the above-described manner was charged at the current of 1500 mA until the battery voltage reached the maximum value and thereafter dropped by 10 mV, and then was left for 30 minutes. After that, each battery was discharged at the current of 1500 mA until the battery voltage reached 1.0V and then was left for 30 minutes. With this being one cycle, this charging and discharging performance was repeated to find the number of cycle in which the discharge capacity became 75% of the initial capacity as to each of the alkaline storage batteries. Then, with the number of cycle of the alkaline storage battery of Comparative Example 1 being taken as cycle life 100, the ratio of cycle life of each alkaline storage battery was determined. The results are shown in Table 1 below.

Further, each of the alkaline storage batteries of Example 1 to 3 and Comparative Examples 1 to 5 activated as above was charged and discharged for 200 cycles as the same way as determination of the cycle life. After that, each alkaline storage battery was disassembled and rinsed to remove the alkaline electrolyte therefrom. Next, each alkaline storage battery was dried and the hydrogen-absorbing alloy powder of the negative electrode in each alkaline storage battery was taken out.

After that, each oxygen concentration of each hydrogen-absorbing alloy powder was measured in inert gas by fusion extracting method using an apparatus for analyzing oxygen made by LECO corporation. Then, with the oxygen concentration of hydrogen-absorbing alloy powder of Comparative Example 1 being taken as oxygen concentration 100, the ratio of oxygen concentration of each hydrogen-absorbing alloy powder of each alkaline storage battery was determined. The results are shown in Table 1 below.

Then, each of the alkaline storage batteries of Examples 1 to 3 and Comparative Examples 1 to 5 that were activated in the above-described manner was charged at the current of 1500 mA until the battery voltage reached the maximum value. After that, each battery was further charged until the battery voltage lowered 10 mV and then was left for 60 minutes. Next, each of the alkaline storage battery was discharged at a current of 6000 mA to find discharge capacity until the battery voltage reached 1.0 V. Then, with the discharge capacity of the alkaline storage battery of Comparative Example 1 being taken as high-rate discharge performances 100, the high-rate discharge performances of each alkaline storage battery was determined. The results are shown in Table 1 below.

TABLE 1

|  | Negative electrode component | | | | Ratio of cycle life | Ratio of oxygen concentration | High-rate discharge performances |
|---|---|---|---|---|---|---|---|
|  | Fluorinated oil/ Fluorine resin (Additive amount) | Surface active agent | Object for dispersion | Apparatus for dispersion | | | |
| Ex. 1 | Fluorinated oil (0.1 parts by mass) | contained | Water | Homogenizer | 120 | 90 | 100 |
| Ex. 2 | Fluorinated oil (0.1 parts by mass) | contained | Aqueous dispersion of SBR | Homogenizer | 130 | Unmeasured | 100 |
| Ex. 3 | Fluorinated oil (0.1 parts by mass) | contained | Water | Planetary mixer | 113 | 96 | 100 |
| Comp. Ex. 1 | — | — | — | — | 100 | 100 | 100 |
| Comp. Ex. 2 | — | contained | Water | Homogenizer | 100 | 100 | 100 |
| Comp. Ex. 3 | Fluorine resin (0.1 parts by mass) | contained | Water | Planetary mixer | 100 | 100 | 100 |
| Comp. Ex. 4 | Fluorine resin (0.5 parts by mass) | contained | Water | Planetary mixer | 106 | Unmeasured | 97 |
| Comp. Ex. 5 | Fluorine resin (0.5 parts by mass) | contained | Water | Planetary mixer | 106 | Unmeasured | 97 |

The results showed that the alkaline storage batteries of Examples 1 to 3 which utilized the hydrogen-absorbing alloy as the negative electrode containing the fluorinated oil and the surface active agent showed more improved cycle life without degradation of high-rate discharge performances as compared with the alkaline storage batteries of Comparative Examples 1 to 5.

Further, there are no differences in cycle life between the alkaline storage batteries of Comparative Examples 1 and 2 using the negative electrode which did not contain the fluorinated oil and the fluorine resin and the alkaline storage battery of Comparative Example 3 using the negative electrode which contained the fluorine resin. As for the reason for that, it is supposed that because the amount of fluorine resin in the negative electrode in Comparative Example 3 was 0.1 parts by mass, which was small, an effect of improving cycle life can not be obtained in Comparative Example 3.

On the other hand, the alkaline storage batteries of Comparative Examples 4 and 5 containing 0.5 parts by mass of fluorine resin per 100 parts by mass of the hydrogen-absorbing alloy showed more improved cycle life but exhibited lower high-rate discharge performances as compared with the alkaline storage batteries of Comparative Examples 1 and 2. Further, as described above, the alkaline storage batteries of Comparative Examples 4 and 5 have problems that the productivity in fabrication of the negative electrode was decreased and the quality of the electrode plate was low.

On the other hand, the alkaline storage batteries of Examples 1 to 3 using the negative electrode wherein the fluorinated oil was contained, although the amount of the fluorinated oil was 0.1 parts by mass, showed more improved cycle life without degradation of high-rate discharge performances. As for the reason for that, it is supposed that because the fluorinated oil is liquid and easy to be dispersed, even if the amount thereof is small, the fluorinated oil effectively contacts with the alloy particle surface and covers the alloy particle surface.

Further, the alkaline storage batteries of Examples 1 and 2 wherein the homogenizer was used for previous dispersion of fluorinated oil and surface active agent showed more improved cycle life as compared with the alkaline storage battery of Example 3 wherein the planetary mixer was used. The reason is thought to be as follows.

In the case where the fluorinated oil and the surface active agent were dispersed by using the homogenizer, the fluorinated oil is more uniformly dispersed as compared with the case of using the planetary mixer. Thus, the fluorinated oil which was more uniformly dispersed was mixed with the hydrogen-absorbing alloy powder, and therefore the fluorinated oil was more uniformly dispersed on the surface of the hydrogen-absorbing alloy particle. Therefore, in the negative electrodes of Examples 1 and 2, it is supposed that because the fluorinated oil was more uniformly dispersed on the surface of the hydrogen-absorbing alloy particle, the contact between the hydrogen-absorbing alloy and the alkaline electrolyte was more restricted as compared with the negative electrode of Example 3. As a result, it is thought to be that oxidization of the hydrogen-absorbing alloy was more restricted and the cycle life of the batteries of Examples 1 and 2 was more improved as compared with Example 3.

Further, the alkaline storage battery of Example 2 wherein the fluorinated oil and the surface active agent was previously dispersed in the aqueous solution of non-aqueous binder showed particular improvement in the cycle life. This is thought to be that because the non-aqueous binder was previously dispersed with the fluorinated oil, the negative electrode wherein the binder was more uniformly dispersed on the surface of the hydrogen-absorbing alloy particle can be obtained.

Although the low polymer of chlorotrifluoroethylene was used as the fluorinated oil in the Examples, other fluorinated oils may be used. For example, when perfluoropolyether is used, the same effects can be obtained.

Although the present invention has been fully described by way of examples, it is to be noted that various changes and modifications will be apparent to those skilled in the art.

Therefore, unless otherwise such changes and modifications depart from the scope of the present invention, they should be construed as being included therein.

The invention claimed is:

1. A negative electrode for alkaline storage battery using a hydrogen-absorbing alloy,
   wherein the hydrogen-absorbing alloy is represented by the general formula $Ln_{1-x}Mg_xNi_{y-a-b}Al_aM_b$ wherein Ln is at least one element selected from the group consisting of Zr, Ti and rare-earth elements including Y, M is at least one element selected from the group consisting of V, Nb, Ta, Cr, Mo, Mn, Fe, Co, Ga, Zn, Sn, In, Cu, Si, P and B, $0.05 \le x \le 0.30$, $0.05 \le a \le 0.30$, $0 \le b \le 0.50$ and $2.8 \le y \le 3.9$,
   wherein fluorinated oil and a surface active agent are contained in said negative electrode.

2. An alkaline storage battery provided with a positive electrode, a negative electrode using a hydrogen-absorbing alloy, and an alkaline electrolyte,
   wherein the negative electrode is the negative electrode for alkaline storage battery as claimed in claim 1.

3. A fabrication method of a negative electrode for alkaline storage battery comprising the steps of:
   dispersing fluorinated oil and a surface active agent in at least one kind selected from an aqueous dispersion of non-aqueous binder, an aqueous dispersion of conductive material, an aqueous solution of aqueous binder, an aqueous solution of viscosity improver, and water to prepare a dispersion; and
   mixing a hydrogen-absorbing alloy powder to the dispersion to prepare negative electrode material paste.

4. The fabrication method of the negative electrode for alkaline storage battery as claimed in claim 3,
   wherein the fluorinated oil and the surface active agent are dispersed by using a homogenizer in at least one kind selected from the aqueous dispersion of non-aqueous binder, the aqueous dispersion of conductive material, the aqueous solution of aqueous binder, the aqueous solution of viscosity improver, and water.

5. The fabrication method of the negative electrode for alkaline storage battery as claimed in claim 3,
   wherein the fluorinated oil and the surface active agent are dispersed in the aqueous dispersion of non-aqueous binder.

6. The fabrication method of the negative electrode for alkaline storage battery as claimed in claim 4,
   wherein the fluorinated oil and the surface active agent are dispersed in the aqueous dispersion of non-aqueous binder.

* * * * *